United States Patent [19]
Shroff

[11] Patent Number: 5,897,841
[45] Date of Patent: Apr. 27, 1999

[54] CONTINUOUS PROCESS FOR PRODUCING PHOSPHINE FUMIGANT GAS

[76] Inventor: Rajnikant D. Shroff, 50 Pali Hill Rd., Bandra, Bombay 400 050, India

[21] Appl. No.: 08/947,571

[22] Filed: Oct. 9, 1997

[51] Int. Cl.⁶ .................................................. C01B 25/06
[52] U.S. Cl. ............................................ 422/129; 423/307
[58] Field of Search ............................... 422/129; 423/307

[56] References Cited

FOREIGN PATENT DOCUMENTS 601187  6/1990  Australia .

*Primary Examiner*—Timothy McMahon
*Attorney, Agent, or Firm*—Hovey, Williams, Timmons & Collins

[57] ABSTRACT

A mobile apparatus (10) is provided for the on-site production of phosphine fumigant gas so as to permit selective delivery over time of essentially constant concentration phosphine gas, thereby assuring complete fumigation of a grain silo or other enclosure. The apparatus (10) includes a mobile frame 12 supporting a reactor assembly (14); the latter includes an elongated stirred reactor (16) with metal phosphide and reactant gas (carbon dioxide and water) inlets (18,20) and a phosphine gas output (22).

11 Claims, 1 Drawing Sheet

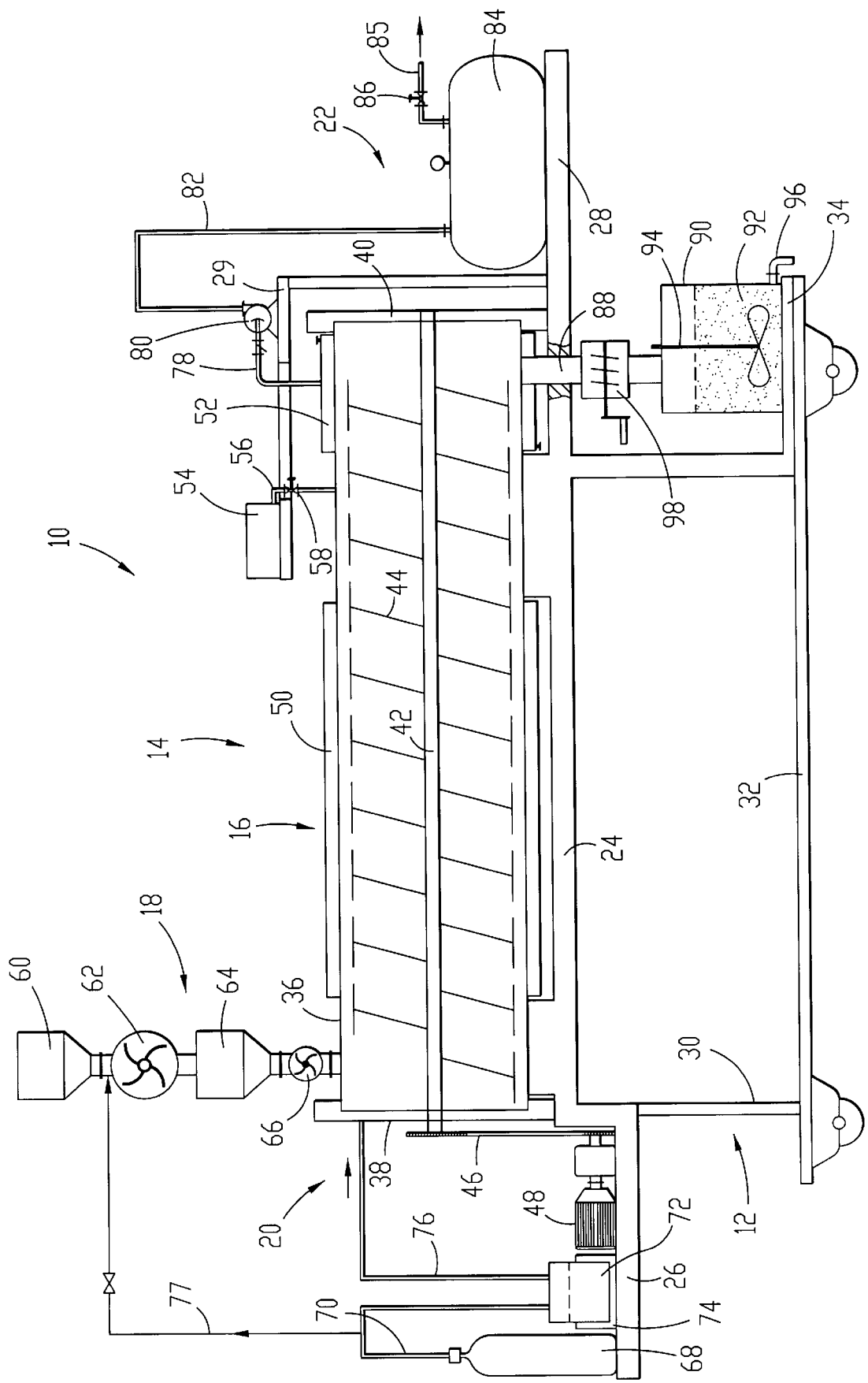

CONTINUOUS PROCESS FOR PRODUCING PHOSPHINE FUMIGANT GAS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention is broadly concerned with a mobile reactor apparatus, and a corresponding method, which permits the on-site fumigation of grain silos and other enclosures with phosphine gas. More particularly, the invention pertains to such apparatus and methods which can achieve relatively high and substantially constant levels of phosphine gas in a silo in order to obtain maximum fumigation thereof; to this end, the invention contemplates a mobile unit supporting a reactor assembly enabling on-site production of phosphine gas directly adjacent a silo or the like so that phosphine may be continuously and directly fed into the silo without intermediate storage in containers.

2. Description of the Prior Art

Fumigation of stored agricultural products such as grain with phosphine gas is the foremost method of preventing insect damage. Typically, fumigation is achieved by introducing metal phosphide pellets or tablets directly into the grain to be fumigated. The metal phosphide reacts with ambient moisture in the air and grain, resulting in the production of phosphine and inert gases. Forced air circulation devices are often used to assist in distribution of the phosphine gas throughout the grain. Where the grain is stored in unsealed containers, a gas tight plastic sheet may be placed over the container to retain the fumigant gas.

A common fumigation problem encountered with prior practices is the inability to maintain a constant concentration of phosphine gas within the silo for an adequate time to achieve complete insect kill. It is known that for the most effective insect control, it is necessary to maintain specific relatively high concentrations of phosphine gas for known periods. However, with prior methods the release of phosphine gas is slow in the initial stages of treatment and the concentration of phosphine builds up only gradually. After a maximum is reached, the concentration of phosphine begins to decline. It is accordingly very difficult for the fumigator to ensure that the necessary phosphine concentration-time parameters are met to achieve complete insect kill. As a consequence, many fumigators tend to over treat grain with phosphine, which is not only wasteful but can present a hazard owing to the flammability of phosphine gas.

Batch processes for the generation of phosphine gas have been proposed in the past, see, e.g., Australian Published Application No. 73446/87. This reference describes a batch reactor for the hydrolysis of metal phosphides to obtain phosphine gas, the latter being stored in closed containers. Such containers can then be used on-site to deliver phosphine gas at a specific concentration throughout a selected period of fumigation. A significant drawback of this technique is the need to containerize the phosphine gas in pressure vessels with subsequent delivery of said vessels to the silo site.

There is accordingly a need in the art for an improved apparatus and method allowing the safe, continuous production of phosphine gas at the site of use so that a desired phosphine concentration/time fumigation can be achieved while avoiding the need to produce phosphine at a remote site with intermediate containerization of the phosphine.

SUMMARY OF THE INVENTION

The present invention overcomes the problems outlined above and provides mobile apparatus for the on-site production of phosphine fumigant gas adjacent a silo or the like for direct delivery and use of the phosphine as it is generated. In preferred forms, the apparatus includes a mobile frame supporting a phosphine reactor assembly. The assembly includes an elongated reactor having shiftable internal mixing means together with means for delivery of particulate metal phosphide and reactant gas (usually including a carrier gas such as carbon dioxide and water) to the reactor. Delivery means is also provided for transfer of phosphine gas directly from the reactor as it is produced to the silo or the like for fumigation thereof.

In more detail, the overall apparatus preferably includes a supply of carbon dioxide gas with an intermediate water tank; conduit means is provided for delivery of the carbon dioxide gas into and through the water tank to produce a reactant gas stream containing carbon dioxide and from about 5–8% by weight water, the reactant gas stream being delivered to the phosphine reactor. Particulate metal phosphide is provided to the reactor by means of a hopper or container for starting phosphide pellets, with an associated pulverizer for generating the particulate phosphide needed for the phosphine reaction. The phosphine output conduit from the reactor is preferably equipped with an in-line trap for removing particulates and the like before the phosphine fumigant gas is delivered for use.

In further preferred forms of the invention, an external heating jacket is disposed about the reactor body intermediate the ends thereof and is adapted to receive an indirect heating media such as steam or hot water. Similarly, the output end of the reactor may be provided with an exterior cooling jacket likewise adapted to receive a cooling media such as tap water.

The phosphine reaction between the particulate metal phosphide and water generates a waste slurry containing metal hydroxides and other materials. In order to handle this byproduct, the reactor of the invention preferably includes an external tank containing soapy water, with a slurry conduit for delivery of the waste slurry to the tank. The soapy water serves to convert any residual phosphine gas in the slurry to a harmless form while neutralizing the hydroxides, allowing safe disposal of the slurry.

In carrying out the method of the invention the mobile apparatus is moved to a location directly adjacent the silo or other enclosures to be fumigated. Respective quantities of particulate metal phosphide and the reactant gas are then fed into the interior of the reactor, resulting in evolution of phosphine gas. This gas is then delivered from the reactor directly to the adjacent silo for fumigation purposes.

BRIEF DESCRIPTION OF THE DRAWINGS

The single FIGURE is a schematic side view of a phosphine production apparatus in accordance with the invention.

DETAILED DESCRIPTION OF THE PREFERRED EMBODIMENT

Turning now to the drawing, a mobile phosphine production apparatus 10 is illustrated. Broadly speaking, the apparatus 10 includes a mobile frame 12 and a reactor assembly 14. The assembly 14 has an elongated reactor 16, metal phosphide delivery means 18, reactant gas delivery means 20, and an output assembly 22 for delivery of phosphine gas from the reactor 16.

In more detail, the frame 12 includes an uppermost reactor-supporting table 24 having end extensions 26 and 28, the latter having an upright, L-shaped support 29 affixed thereto. The table and extensions are supported by upright leg members 30 connected to a wheeled undercarriage 32. The undercarriage 32 has an extension 34 as shown.

The reactor 16 is in the form of an elongated, tubular body 36 presenting a closed reactant input end 38 and an opposed, closed output end 40. The reactor 16 is equipped with internal mixing means in the form of an elongated, axially rotatable shaft 42 supporting outwardly extending mixing elements 44. As illustrated, the shaft 42 extends through end 38 and is operatively coupled with a drive assembly 46, the latter being connected to electrical drive motor 48 supported on extension 26.

An elongated exterior heating jacket 50 is disposed about body 36 between ends 38 and 40. The jacket 50 includes conventional input and output fittings (not shown) for introduction of heating media such as steam or hot water into the jacket. The jacket 50 is in thermal contact with the tubular side wall of body 36 so as to indirectly heat the reactants therein during phosphine gas generation. In addition, a smaller cooling jacket 52 is disposed about body 16 adjacent output end 40, and similarly includes input and output fittings (not shown) for introduction of a cooling medium such as tap water. The jacket 52, being in thermal contact with the wall of body 16, serves to cool the reactants within body 36 adjacent end 40. A small tank 54 adapted to hold an aqueous acidic medium is situated above reactor body 36 and is mounted on support 29. A conduit 56 having a valve 58 therein extends from tank 54 and communicates with the interior of reactor 16 for delivery of the acidic medium into the confines of the reactor for pH control as needed.

The phosphide delivery means 18 includes an uppermost hopper 60 adapted to hold a supply of metal phosphide tablets. The hopper 60 is coupled with a powered pulverizer 62, the latter being coupled with and leading to a secondary hopper 64. The output from hopper 64 passes through a secondary pulverizer/air lock 66 and into reactor 16 as shown.

The reactant gas delivery means 20 is supported on extension 26 and includes a pressurized container 68 of carbon dioxide having a valved output conduit 70 leading to a water tank 72. The tank 72 may optionally be seated within an electrical resistance heater 74. A delivery conduit 76 extends from a point beneath the surface of water within tank 72 to end 38 of reactor 16; the conduit 76 passes through this end and communicates with the interior of the reactor so as to deliver the reactant gas made up of carbon dioxide and water to the reactor. A valved slip stream conduit 77 is operatively coupled between conduit 70 and the output of hopper 60 in order to selectively supply carbon dioxide which assists in pulverization of the starting pellets.

The phosphine gas output delivery means 22 includes a valved conduit 78 leading to the input of vacuum pump 80. The output of pump 80 is coupled via conduit 82 and leads to a conventional trap 84 supported on table extension 28. A phosphine delivery line 85, equipped with valve 86, leads from trap 84 for direct coupling to a silo or other enclosure holding product to be fumigated.

The byproduct sludge generated during use of apparatus 10 (comprising metal hydroxides and trace amounts of phosphine gas) passes through sludge output pipe 88 to an underlying tank 90 containing a solution of soapy water 92. The tank 90 is equipped with an agitator 94 and a drain fitting 96. As illustrated, the pipe 88 passes through an opening in extension 28, and has a manually operated dispenser 98 allowing the user to dispense accumulated sludge into the tank 90. The soapy water solution 92 in tank 90 serves to strip and convert any residual phosphine gas in the sludge and moreover reacts with the metal hydroxides in the sludge to render the latter environmentally harmless.

EXAMPLES

It is to be understood that the following examples are provided by way of illustration only, and nothing therein should be taken as a limitation upon the overall scope of the invention.

Example 1

Two thousand grams of aluminum phosphide tablets are pulverized and fed to a reactor (42 inches in length, 6 inches in diameter) by continuously slow addition at a feed rate of 500 grams per hour. The active ingredient content of the pulverized material is 58.54% by weight. Carbon dioxide gas is bubbled through hot water to form a reactant gas made up of carbon dioxide and from about 5–8% by weight water vapor. This reactant gas is fed to the reactor at a rate of 10 grams per minute. Within about 2–3 minutes phosphine gas is generated at the reactor outlet. After about 60 minutes of reaction, the content of phosphine gas in the output of the reactor is 2300 ppm. Thereafter at 120, 180 and 240 minutes, the phosphine concentration is about 2400 ppm.

Example 2

This example is similar to Example 1, except that 2500 grams of pulverized aluminum phosphide (58.35% by weight active ingredient) is fed to the reactor at a rate of 500 grams per hour, along with the same carbon dioxide/water vapor reactant gas stream at a flow rate of 15 grams per minute. Within 2–3 minutes the concentration of phosphine gas in the reactor output is between about 2400–2475 ppm.

Examples 3–9

The following examples are carried out as described in examples 1–2. The table sets forth reactant conditions and outputs.

| Example No. | Metal Phosphide (% Active) Flow Rate | Reactant Gas Flow Rate | Phosphine Gas Output Over Time |
|---|---|---|---|
| 3 | Magnesium Phosphide (67.12%) 500 g/hr. | Carbon Dioxide/ 6–8% Moisture 10 g/min. | 60 min: 2400 ppm 120 min: 2400 ppm 180 min: 2500 ppm 240 min: 2500 ppm |
| 4 | Aluminum Phosphide (58.54%) 500 g/hr. | Carbon Dioxide/ 5–8% Moisture 19 g/min. | 1–2 min: 2500–2550 ppm |
| 5 | Aluminum Phosphide (58.54%) 500 g/hr. | Carbon Dioxide/ 6–8% Moisture 19 g/min. | 2–3 min: 2425–2550 ppm |
| 6 | Magnesium Phosphide (67.49%) 500 g/hr. | Carbon Dioxide 5–8% Moisture 20 g/min. | 1–2 min: 2500–2550 ppm |
| 7 | Magnesium Phosphide (58.54%) | Carbon Dioxide 6–8% Moisture | 2–3 min: 2400–2550 ppm |

-continued

| Example No. | Metal Phosphide (% Active) Flow Rate | Reactant Gas Flow Rate | Phosphine Gas Output Over Time |
|---|---|---|---|
| 8 | 500 g/hr. Aluminum Phosphide (58.54%) 500 g/hr. | 29 g/min. Carbon Dioxide 5–8% Moisture 29 g/min. | 1–2 min: 2450–2525 ppm |
| 9 | Magnesium Phosphide (67.54%) 500 g/hr. | Carbon Dioxide 5–8% Moisture 30 g/min. | 1–2 min: 2525–2550 ppm |

I claim:

1. Apparatus for the on-site production of phosphine fumigant gas adjacent grain-holding facility, said apparatus comprising:
   a reactor assembly including
      an elongated reactor comprising an elongated, tubular, generally horizontally oriented body presenting respective metal phosphide and reactant gas inlets adjacent one end thereof and a phosphine gas outlet adjacent the opposite end thereof, said reactor including an external heating jacket disposed about and in thermal contact with said reactor and located between said inlets and said outlet, said reactor further including an external cooling jacket disposed about and in thermal contact with said reactant and located closer to said outlet than said external heating jacket;
      a delivery unit for delivery of particulate metal phosphide to said reactor through said metal phosphide inlet;
      a delivery assembly for directing a stream of reactant gas containing a carrier gas and water to said reactor through said reactant gas inlet for reaction therein with said metal phosphide to produce phosphine gas; and
      a mobile frame including wheels attached thereto supporting said reactor assembly.

2. Apparatus for the on-site production of phosphine fumigant gas adjacent gain-holding facility, said apparatus comprising:
   a reactor assembly including
      an elongated reactor having an internal mixer;
      a delivery unit for delivery of particulate metal phosphide to said reactor;
      a delivery assembly for directing a stream of reactant gas containing a carrier gas and water to said reactor for reaction therein with said metal phosphide to produce phosphine gas;
      an output device for delivery of said phosphine gas from said reactor to said facility;
      a receiver operatively coupled with said reactor for receiving waste slurry therefrom, and for treating the slurry; and
      a mobile frame including wheels attached thereto supporting said reactor assembly.

3. Apparatus as set forth in claim 2, said slurry receiver including a tank adapted to contain a quantity of soapy water, and conduit means for delivery of said slurry from said reactor to said tank.

4. Apparatus as set forth in claim 2, said delivery assembly including a supply of carbon dioxide gas, a water tank, a first conduit leading from said supply to said water tank, and a second conduit leading from said water tank to the interior of said reactor for delivery of said reactant gas thereto.

5. Apparatus as set forth in claim 2, said phosphide delivery unit comprising a hopper for holding a supply of metal phosphide pellets, a pulverizer for said pellets, and a pipe for delivery of pulverized metal phosphide into the interior of said reactor.

6. Apparatus as set forth in claim 2, said output device including an output conduit operatively coupled and in communication with the interior of said reactor, and a trap interposed in said conduit for trapping particulate material.

7. Apparatus as set forth in claim 2, said reactor comprising an elongated, tubular body presenting respective metal phosphide and reactant gas inlets adjacent one end thereof and a phosphine gas outlet adjacent the opposite end thereof, said reactor including an external heating jacket disposed about and in thermal contact with said reactor and located between said inlets and said outlet.

8. Apparatus as set forth in claim 7, including an external cooling jacket disposed about and in thermal contact with said reactor and located adjacent said outlet.

9. Apparatus as set forth in claim 2, including a supply of acidic aqueous medium, and conduit means for selective delivery of said medium to the interior of said reactor.

10. A method for the on-site fumigation of a grain-holding facility comprising the steps of:
   providing phosphine fumigant gas production apparatus having
      a reactor assembly including
         an elongated reactor having an internal mixer;
         a delivery unit for delivery of particulate metal phosphide to said reactor;
         a delivery assembly for directing a stream of reactant gas containing a carrier gas and water to said reactor for reaction therein with said metal phosphide to produce phosphine gas;
         an output device for delivery of said phosphine gas from said reactor to said facility;
         a receiver operatively coupled with said reactor for receiving waste slurry therefrom, and for treating the slurry; and
         a mobile frame including wheels attached thereto supporting said reactor assembly;
   moving said apparatus to a location directly adjacent said facility to be fumigated;
   passing respective quantities of said particulate metal phosphide and said reactant gas into the interior of said reactor, and causing the formation of phosphine gas; and
   delivering said phosphine gas from said reactor directly to said facility.

11. A method for the on-site fumigation of a grain-holding facility comprising the steps of:
   providing phosphine fumigant gas production apparatus having
      a reactor assembly including
         an elongated reactor comprising an elongated, tubular, generally horizontally oriented body presenting respective metal phosphide and reactant gas inlets adjacent one end thereof and a phosphine gas outlet adjacent the opposite end thereof, said reactor including an external heating jacket disposed about and in thermal contact with said reactor and located between said inlets and said outlet, said reactor further including an external cooling jacket disposed about and in thermal contact with said reactant and located closer to said outlet than said external heating jacket;

a delivery unit for delivery of particulate metal phosphide to said reactor through said metal phosphide inlet;

a delivery assembly for directing a stream of reactant gas containing a carrier gas and water to said reactor through said reactant gas inlet for reaction therein with said metal phosphide to produce phosphine gas; and a mobile frame including wheels attached thereto supporting said reactor assembly;

moving said apparatus to a location directly adjacent said facility to be fumigated;

passing respective quantities of said particulate metal phosphide and said reactant gas into the interior of said reactor, and causing the formation of phosphine gas; and delivering said phosphine gas from said reactor directly to said facility.

\* \* \* \* \*